United States Patent Office 2,858,271
Patented Oct. 28, 1958

2,858,271

WELL DRILLING FLUIDS AND METHOD OF MAKING THE SAME

Gerald J. Byrd, Calgary, Alberta, Canada, assignor to Lignosal Chemicals Limited, Quebec, Quebec, Canada No Drawing. Application September 7, 1956
Serial No. 608,443

5 Claims. (Cl. 252—8.5)

This invention relates to an improved well drilling fluid for use in drilling oil and gas wells and to a method of producing the same.

In the drilling of deep wells, as for example oil or gas wells, a drilling fluid or mud is usually used. This fluid, which is pumped down the inside of the drill pipe and returns upward in the annulus between the drill pipe and the hole, serves several purposes. It acts as a cooling medium and lubricant for the drill bit and as medium for the transport of drill cuttings to the surface as well as producing a sealing layer on the wall of the hole. The fluid normally consists of a suspension in water of a swelling or hydratable clay, such as bentonite, together with such clay or finely divided material as may be produced from the soil in the course of drilling. Other materials may also be added, such as weighting materials where high pressures may be encountered, starches and gums to promote the wall sealing properties of the fluid as well as a number of other materials which are used to produce fluids for use under special conditions.

Because of its function in removing the cuttings from the hole it is necessary that the viscosity characteristics of the fluid should fall within a definite range. The viscosity of the fluid should be high enough to support the cuttings in their travel from the drill bit to the surface but should not be so high as to make circulation difficult and develop unduly high pressures in the pumping system. At the same time the gel strength, which develops on standing, should be high enough to prevent settling of the cuttings in the well if circulation should be stopped for any reason but the gel should not develop fast enough to prevent the settling and removal of the cuttings in the mud pit. Further the gel should not develop to a point where difficulties would be encountered on the resumption of pumping.

The required mud characteristics are sometimes obtained with an untreated suspension of sodium bentonite but it is frequently necessary, especially where higher densities are required in the mud to add conditioners or thinners in order to obtain lower viscosities and gel strengths. For this purpose a number of materials are used as for instance certain phosphate compounds as well as quebracho and certain other tannin extracts. Sulphite liquor and various lignosulphonate compounds have been found to be ineffective for this purpose.

Under certain conditions, as for instance when excessive contamination from salt or anhydrite is to be encountered it is desirable to convert the sodium bentonite in the mud to a calcium bentonite. This is the so-called "breakover" from a sodium mud to a lime mud. In this operation sodium hydroxide and calcium hydroxide are added to the mud usually in proportions of about 2 and 5 pounds per barrel of mud respectively. The immediate effect of the addition of these materials is rapid increase in the viscosity of the mud to the point where a gelation may occur which will prevent the completion of the "breakover." In order to control the viscosity at this point and to assure a smooth and rapid "breakover" as well as to ensure satisfactory viscosities and gel strengths in the resulting lime muds, it is necessary to add conditioner or thinner. For this purpose lignin preparations have been widely used, as for instance lignosulphonates prepared by precipitation with lime and sulphite liquor products as described in copending application S. N. 578,603, filed April 17, 1956. Quebracho has sometimes been used alone or in conjunction with lignin products but when used alone it has generally been found to be less effective than the lignins. All the materials commonly used for this purpose suffer from a common drawback in that while they are sufficiently effective to permit the "breakover" to go to completion, they do allow the appearance of transient, very high viscosity and the gelation of the mud for a short period of time.

The object of the present invention is to provide a satisfactory lignin based material for the control of viscosity of sodium base muds. A second object is to provide a material which may be used for the control of the viscosity of sodium muds and at the same time serve as a viscosity control agent during "breakover" when it is necessary to convert the mud to a lime mud. A third object is to provide a material which will permit the conversion to a lime mud without any gel formation and with little or no transient increase in viscosity.

The base material in the production of the dispersant is sodium base sulphite liquor. This liquor is preferably obtained by replacement of the calcium ions in a lime base liquor with sodium ions as described in Canadian Patent 505,355 but liquor obtained by the cooking of wood with sodium bisulphite cooking liquors may also be used as may liquor in which the calcium is replaced by sodium by other methods. The liquor, having been brought to a total solids content of about 50% and with the pH preferably adjusted to about 7, is introduced into a pressure vessel. It is here heated to a temperature of 270 to 300° F., either with live steam or by means of heat exchange through a coil. Air is then admitted through a sparger at the rate of about 0.5 to 1 cubic foot per minute for each gallon of liquid in process to partially oxidize the material. A minimum reaction time of about 1 hour is required for best properties and at lower air flow rates reaction times up to 3 hours may be necessary. The pH of the product (initially about 7) decreases with time of treatment and best results are normally obtained at a final pH of 4 to 4.5. Prolonging the treatment time will impair the properties of the product. It should not exceed 4 hours at the higher rates of air flow or 6 hours at the lower rates. The pH should not be allowed to drop below 3.5 during treatment.

At the completion of the air treatment the liquor is mixed with alkali metal dichromate in an amount to give not less than 5% nor more than 25% dichromate calculated on the total weight of the solids present. The mixture is then spray dried under normal conditions as to temperature and air flow. Typical temperature conditions are 520 and 300° F. on the inlet and outlet air respectively. In use this reaction product of partially oxidized sodium base sulphite liquor and alkali metal dichromate is mixed in minor proportion with a clay suspension. Bentonite type clay is preferred.

The spray drying operation in itself presents no unusual problems but certain precautions must be observed in the treatment of the compounded product prior to spray drying. Lignin dichromate mixtures are subject to a previously repeated tendency to form insoluble gels. The rate of this reaction is governed by the proportion of dichromate salt in the mixture and by the solids concentration and pH as well as the temperature of the solution. The viscosity increase which precedes the gel formation creates difficulties in transfer and spray drying of the liquid, while the formation of the gel makes it impossible to carry out this operation. The dispersing properties of the material are also impaired by the reactions associated with the viscosity increase and gel formation. This is particularly true when the dispersant is used in lime base drilling muds where over reacted material will give rise to a highly thixotropic (i. e. very high "10 minute gels") mud. These difficulties may be overcome by adjustment of the concentration of the solution and by close control of the elapsed time between the addition of the dichromate salt and the conversion to powder in the spray drier.

Normal feed to spray driers, of materials of this type, contains about 50% total solids. At this concentration a gel would be formed almost immediately on the addition of a dichromate salt. At 30% concentration, including the dichromate content, the onset of the gel formation, as well as of the impairment of dispersing properties, is delayed by about 30 minutes. At 40% concentration a delay of about 15 minutes may be safely tolerated.

In order to operate within these conditions it is necessary that the dichromate salt in the form of solution be mixed continuously with the lignin solution. The concentration of the dichromate solution may be adjusted so as to give the required concentration in the final solution. Mixing may be carried out in a centrifugal pump or similar equipment designed to give high turbulence. Pipe lines leading to the spray drier should be kept as short as possible and intervening tanks should be eliminated. Preferably feed should be made directly from the feed pump to the atomizer of the drier but if a gravity feed to the atomizer is essential the head tank should be made as small as possible.

EXAMPLE

Dilute lime base sulphite liquor was treated with sulphur dioxide to total titratable sulphur dioxide content of about 0.80% and was then neutralized with sodium hydroxide to a pH of 7. After filtration to remove the precipitated calcium sulphite, the liquor was evaporated to a solids content of 50%. 300 gallons of the evaporated liquor was introduced to an autoclave and the charge brought to 295° F. by the introduction of live steam. Air was then admitted through a sparger at the rate of 150 cubic feet per minute (in terms of air at atmospheric pressure) and the treatment continued for 2 hours, sufficient steam being added to maintain the temperature at the same level. At the completion of the treatment the charge was blown from the autoclave and mixed continuously with a sodium dichromate solution, to give 15% sodium dichromate on the total weight of material at 30% total solids in the solution. The mixture was spray dried concurrently with the mixing operation with an elapsed time between mixing and spray drying of 15 minutes.

Measurements of the dispersing properties of the material at various stages in its production were now carried out both on sodium base drilling mud and in the "breakover" of sodium base muds to lime base muds. A synthetic drilling mud was prepared by making up at 7% slurry of bentonite which after ageing overnight showed the following properties immediately after vigorous agitation.

Viscosity _____cps__ 14.5
0 gel _____gms__ 5
10 min. gel _____gms__ 5.5
pH _____ 8.5

The stock mud was divided into 350 cc. portions and 1 gm. of the dispersant at various stages of manufacture added to each. The pH of each portion was adjusted to 11.5 with sodium hydroxide solution and after vigorous agitation the viscosities and gel strengths were measured on a Stormer viscosimeter in accordance with the recommendations of the American Petroleum Institute. The results are shown in Table I.

*Table I*

| Dispersant | Viscosity | Gel, 0-10 mins. | |
| --- | --- | --- | --- |
| (1) None | (¹) | (¹) | (¹) |
| (2) Sodium base sulphite liquor | 100 | 70 | 140 |
| (3) Sodium base sulphite liquor solids + 15% Na₂Cr₂O₇ | 26 | 20 | 100 |
| (4) Sodium base sulphite liquor solids air treated 2 hours | 55 | 50 | 190 |
| (5) Sodium base sulphite liquor solids air treated 2 hours + 15% Na₂Cr₂O₇ | 17 | 10 | 55 |
| (6) The same after spray drying | 10 | 0 | 45 |

¹ Gelled completely.

Similar tests were carried out on the "breakover" from a sodium base to a lime base mud. The procedure used was as follows: To 350 cc. of the mud was added after vigorous agitation 2 gms. (corresponding to 2 lbs. per barrel of mud) of each of the dispersants. After further agitation 5 gms. calcium hydroxide and 2 gms. sodium hydroxide was added in solid state. After further agitation the viscosities and gel strengths were determined as above. Following the addition of calcium and sodium hydroxides there is normally a sharp increase in viscosity to the point where a gel forms at the surface of the agitated mud. The duration of this period of gellation has been measured and is recorded as "breakover" time. The results are shown in Table II.

*Table II*

| | Breakover Time, secs. | Viscosity, cps. | Gels (gms.), 0-10 min. | |
| --- | --- | --- | --- | --- |
| (1) Sodium base sulphite liquor solids | 17 | 17 | 10 | 230 |
| (2) Sodium base sulphite liquor solids + 15% Na₂Cr₂O₇ | 7 | 11 | 0 | 150 |
| (3) Sodium base sulphite liquor solids air treated for 2 hours | 3 | 10 | 0 | 130 |
| (4) Sodium base sulphite liquor solids air treated 2 hours + Na₂Cr₂O₇ | 1 | 8.5 | 0 | 95 |
| (5) The same spray dried | 1 | 8.5 | 0 | 65 |

A further series of tests were carried out in which calcium sulphate was added to the sodium bentonite slurry in order to simulate gypsum contamination as encountered in actual drilling. Dispersant in the amount of 2 grams was added to a 350 cc. portion of the sodium bentonite slurry and after vigorous agitation 3 grams of calcium sulphate was added. After further agitation the viscosities and gel strengths were measured as above. The results are shown in Table III.

*Table III*

| Dispersant | Viscosity | Gel, 0-10 min. | |
| --- | --- | --- | --- |
| (1) None | (¹) | (¹) | (¹) |
| (2) Sodium base sulphite liquor solids | 32 | 30 | 70 |
| (3) Sodium base sulphite liquor solids +15% Na₂Cr₂O₇ | 29 | 15 | 65 |
| (4) Sodium base sulphite liquor solids air treated 2 hours | 32 | 15 | 65 |
| (5) Sodium base sulphite liquor solids air treated +15% Na₂Cr₂O₇ | 29 | 10 | 65 |
| (6) As above—spray dried | 23 | 5 | 50 |

¹ Gelled completely.

I claim:

1. A well drilling fluid consisting essentially of an aqueous clay slurry having incorporated therein by agitation substantially 5 pounds of calcium hydroxide and 2 pounds of sodium hydroxide per barrel of slurry, and at least 1 pound per barrel of dried sodium base sulphite liquor material, said material having been obtained by a method comprising heating sodium base sulphite liquor having a pH of about 7 in a closed zone at a temperature of 270 to 300° F., passing air into the hot liquor to oxidize the material and reduce its pH to 4–4.5, mixing with the liquor not substantially less than 5% nor more than 25% of its solids content of alkali metal dichromate and promptly spray drying the mixture to avoid gel formation.

2. The well drilling fluid defined in claim 1 wherein the clay is sodium bentonite.

3. The well drilling fluid defined in claim 1 containing substantially 3 pounds per barrel of calcium sulphate.

4. A method of drilling a well comprising circulating in the well a well drilling fluid consisting essentially of an aqueous sodium base clay slurry, substantially five pounds of calcium hydroxide and substantially two pounds of sodium hydroxide per barrel of slurry, at least one pound of dispersing agent comprising dried sodium base sulphite liquor solids and not substantially less than 5 and not more than 25% of alkali metal dichromate, said sulphate liquor solids having been oxidized by passing air through sodium base sulphite liquor having a pH of about 7 in a closed zone at a temperature of 270 to 230° F. to reduce its pH to 4–4.5 and promptly spray drying the mixture to avoid gel formation.

5. The method defined in claim 4 wherein the clay is sodium bentonite.

References Cited in the file of this patent

UNITED STATES PATENTS

| | | |
|---|---|---|
| 1,149,420 | Strehlenert et al. | Aug. 10, 1915 |
| 1,154,762 | Gross | Sept. 28, 1915 |
| 1,731,443 | Onnertz et al. | Oct. 15, 1929 |
| 2,491,436 | Barnes | Dec. 13, 1949 |
| 2,491,437 | Perkins | Dec. 13, 1949 |
| 2,674,575 | Lewis et al. | Apr. 6, 1954 |

OTHER REFERENCES

Lawton et al.: Chemical Treatment of Rotary Drilling Fluids, article in Physics, vol. 2, pages 374 and 375, May 1932.

UNITED STATES PATENT OFFICE
CERTIFICATE OF CORRECTION

Patent No. 2,858,271                                        October 28, 1958

Gerald J. Byrd

It is hereby certified that error appears in the above numbered patent requiring correction and that the said Letters Patent should read as corrected below.

In the grant, lines 2 and 12, and in the heading to the printed specification, line 5, name of assignee, for "Lignosal Chemicals Limited", each occurrence, read -- Lignosol Chemicals Limited --.

Signed and sealed this 30th day of June 1959.

(SEAL)
Attest:

KARL H. AXLINE                                        ROBERT C. WATSON
Attesting Officer                                    Commissioner of Patents